United States Patent [19]

Murphy

[11] Patent Number: 5,712,625
[45] Date of Patent: Jan. 27, 1998

[54] VEHICLE OPERATOR VERIFICATION SYSTEM THAT PREVENTS VEHICLE ADAPTING SYSTEMS FROM ADAPTING

[75] Inventor: Morgan Daniel Murphy, Kokomo, Ind.

[73] Assignee: Delco Electronics Corporation, Kokomo, Ind.

[21] Appl. No.: 441,107

[22] Filed: May 15, 1995

[51] Int. Cl.[6] ............................ B60R 1/00; B60N 2/00
[52] U.S. Cl. ........................... 340/825.31; 318/568.1; 318/671; 297/330; 297/344.17; 297/362.11; 307/10.1
[58] Field of Search .................... 340/825.3, 825.31, 340/524; 364/424.05; 318/568.1, 466, 671, 447; 297/341, 330, 344.17, 362.11; 180/330; 307/10.1, 10.5, 10.8

[56] References Cited

U.S. PATENT DOCUMENTS

| | | | |
|---|---|---|---|
| 4,451,887 | 5/1984 | Harada et al. | 318/466 X |
| 4,477,874 | 10/1984 | Ikuta et al. | 340/825.31 X |
| 4,920,338 | 4/1990 | Tsunoda et al. | 340/825.31 X |
| 5,278,547 | 1/1994 | Suman et al. | 340/825.32 |
| 5,511,724 | 4/1996 | Freiberger et al. | 236/49.3 |
| 5,552,789 | 9/1996 | Schuermann | 340/825.31 X |
| 5,554,912 | 9/1996 | Thayer et al. | 307/10.8 |

FOREIGN PATENT DOCUMENTS 61-238541  10/1986  Japan ............... 364/424.05

Primary Examiner—Brian Zimmerman
Assistant Examiner—William H. Wilson, Jr.
Attorney, Agent, or Firm—Jimmy L. Funke

[57] ABSTRACT

A vehicle operator identification verification system that correlates an operator identification code with certain vehicle conditions such as seat position and side mirror position. A personalization command system receives the operator identification code from a key fob transmitter, and correlates the identification code with stored identification codes. The command system will then initiate various adapting systems that correspond to the received identification code. Further, the command system will cause various personalization devices, such as seats and mirror positioning devices, to be actuated to a position corresponding to a stored position associated with the received operator identification code. If one or more of the various personalization devices are adjusted by the vehicle operator a certain percentage beyond the settings that correspond to the received operator identification code, system will prevent the adapting systems from adapting to the current vehicle operator.

16 Claims, 2 Drawing Sheets

| SEAT FRONT/BACK POSITION VALID | SEAT UP/DOWN POSITION VALID | MIRROR POSITION INVALID | OTHER VALIDATING DEVICE VALID | = INVALID |

| SEAT FRONT/BACK POSITION INVALID | SEAT UP/DOWN POSITION VALID | MIRROR POSITION INVALID | OTHER VALIDATING DEVICE VALID | = INVALID |

Fig-2

VEHICLE OPERATOR VERIFICATION SYSTEM THAT PREVENTS VEHICLE ADAPTING SYSTEMS FROM ADAPTING

BACKGROUND OF THE INVENTION

1. Field of the Invention

This invention relates generally to a system for verifying a vehicle operator identification code and, more particularly, to a system for verifying a vehicle operator identification code by determining positional information of various personalized vehicle devices such as a seat positioning device, a mirror positioning device, a steering wheel tilt positioning device and a head-up display positioning device.

2. Discussion of the Related Art

Current technology in the manufacture of vehicles includes advancements directed to personalization of certain vehicle systems to a particular vehicle operator. One particular personalization advancement is an electronic climate control system as disclosed in U.S. patent application Ser. No. 08/344,189, filed Nov. 23, 1994, titled ADAPTIVE CLIMATE CONTROL SYSTEM, now U.S. Pat. No. 5,511,724 assigned to the assignee of the instant application, and herein incorporated by reference. This adaptive climate control system is an improvement of known electronic climate control (ECC) systems that automatically control the climate within the passenger compartment of a vehicle based on a number of parameters that affect the climate. These parameters are initially preprogrammed and calibrated to a particular comfort level by a climate control calibration engineer at the manufacturing level of the vehicle.

The adaptive ECC system allows adjustments to the climate control system by a particular vehicle operator to teach the system to automatically be set to the operator's comfort level. For example, if the vehicle operator adjusts the temperature set point of the ECC system at a particular ambient air temperature, the system will store this change for that ambient air temperature. Once the change has been validated, the next time the system encounters that ambient air temperature, or an ambient air temperature around that ambient air temperature, the system will automatically provide the appropriate air mixture as previously set by the vehicle operator. Further, the adaptive ECC system will adapt the blower speed to the preference of the vehicle operator. Each time the vehicle operator adjusts the blower speed to a particular value, and the adaptive system validates the change in blower speed, the system will automatically readjust the blower speed for subsequent environmental conditions sensed by the system.

Another system that has been the subject of personalization is an adaptive instrument display brightness control system that automatically controls the instrument display brightness of a vehicle display based on the vehicle operator's changes to the display brightness at particular ambient light intensities. This system is disclosed in U.S. patent application Ser. No. 08/441,505 filed May 15, 1995, now U.S. Pat. No. 5,554,912, titled ADAPTIVE INSTRUMENT DISPLAY BRIGHTNESS CONTROL SYSTEM, assigned to the assignee of the instant application, and herein incorporated by reference. This adaptive brightness control system is originally calibrated to a particular brightness for a range of ambient light intensities. The system will automatically select an instrument display brightness value from a brightness look-up table based on the ambient light intensity as sensed by a light sensor. If the vehicle operator adjusts the instrument display brightness, and the change to the brightness is within a learning range of the system, the system will adjust the look-up table at and around the particular ambient light intensity a predetermined percent of the difference between the original brightness setting and the new brightness setting after the change to the display brightness has been validated.

Another vehicle system that has also been the subject of personalization is an adaptive system for adjusting the volume level of an audio system of a vehicle in response to changes in certain noise causing conditions such as vehicle speed, climate control mode and blower speed. This adaptive system is disclosed in U.S. patent application Ser. No. 08/437,555 filed May 9, 1995, now abandoned, titled ADAPTIVE SYSTEM FOR DETERMINING VOLUME GAIN FOR VEHICLE AUDIO SYSTEMS, assigned to the assignee of the instant application, and herein incorporated by reference. In this adaptive system a climate control mode and blower speed signal from an electronic climate control system indicative of the blower mode and speed, and a vehicle speed signal from a speed sensor system indicative of vehicle speed are applied to a microprocessor. The microprocessor determines which of the two signals provides a greater, and thus controlling noise contribution that will effect the perception of an audio signal from the vehicle audio system. The microprocessor selects an appropriate audio value from an audio look-up table so as to adjust the audio level of the audio system to compensate for the controlling noise contribution. A vehicle operator may manually adjust the audio level of the audio system based on his preferences. If the change to the audio level is within a learning range of the system, the system will adjust the look-up table at and around the particular audio value for that noise contribution level a predetermined percent of the difference between the original audio level setting and the adjusted audio level setting if the change is validated.

Yet another area that has been the subject of vehicle personalization concerns an adaptive system that sets a particular radio frequency of a vehicle radio to a vehicle operator's preference at vehicle start-up with respect to the time of day. This adaptive system is disclosed in U.S. patent application Ser. No. 08441,109, filed May 15, 1995, pending, titled ADAPTIVE SYSTEM FOR DETERMINING RADIO FREQUENCY AT VEHICLE START-UP, assigned to the assignee of the instant application, and herein incorporated by reference. When the vehicle and radio are on, the adaptive system will receive from a memory a highest priority radio frequency and volume level previously set by the vehicle operator for a particular stored time interval of the day. The adaptive-system will then monitor any changes the vehicle operator makes to the frequency and the volume level of the radio for each predetermined time interval so as to update a frequency priority list of the radio frequency and an average desired volume level of the preferences for the vehicle operator at each time interval. The adaptive system will store the frequency priority list and average volume level of the vehicle operator's preferences at each time of day interval such that if the vehicle is started at any of the time of day intervals, the system will be able to automatically set the radio frequency and volume level to the vehicle operator's preference.

In order to achieve the maximum benefit of the above described adaptive systems, as well as other adaptive systems that may be developed, it is proposed by this invention that these systems be initiated and performed in connection with a vehicle operator identification (ID) verification system. In other words, in order to prevent the different adaptive systems from adapting to different vehicle operators that may personalize the systems differently, it is necessary that the adaptive systems adapt independently to multiple vehicle operators based on some form of operator identification system. Currently, some vehicles incorporate an operator recognition system where a vehicle operator will utilize a key fob transmitter as part of, for example, a keyless entry system to transmit a coded signal to the vehicle. Activation of the key fob transmitter will cause the transmitter to transmit a key fob identification code that is deciphered by a key fob reader within the vehicle. The signal from the key fob transmitter may include certain function information in addition to the identification code that will cause the vehicle to automatically perform some function such as unlocking the doors as the vehicle operator approaches the vehicle.

Some vehicles that incorporate a remote keyless system as just described also cause certain vehicle personalization functions to automatically be performed when a particular operator identification code is received. For example, certain vehicles incorporate motorized seat adjustment devices and mirror adjustment devices. Therefore, when a key fob reader receives a particular identification code, the personalization systems within the vehicle will cause the motors to be activated to automatically adjust the seat position and mirror position to the preference of the operator assigned to the code.

A problem exists in the above-identified personalization system that may effect the different adaptive systems. For example, one vehicle operator, such as a parent, may allow another vehicle operator, such as his child, to drive his vehicle using the parent's identification key fob transmitter. Although the seat and mirror position will be activated in response to the parent's key fob transmitter, the child may then adjust these positions for his own comfort. However, the adaptive systems will recognize the parent's identification code. If the child applies inputs to the different adaptive systems, the systems will begin to adapt to the child's preferences, thereby causing the parent to become dissatisfied with the state of the adaptive systems. Therefore, it is important to provide a mechanism for preventing unwanted adaptation.

What is needed is a vehicle operator ID verification system to determine if the current vehicle operator corresponds to the operator assigned to the particular vehicle ID code received by the system. It is therefore an object of the present invention to provide such a verification system.

SUMMARY OF THE INVENTION

In accordance with the teaching of the present invention, a vehicle operator ID verification system is disclosed that correlates an operator ID code with certain vehicle parameters such as seat position and side mirror position. In one embodiment, a key fob transmitter transmits a vehicle operator identification signal that is received and deciphered by a receiver within the vehicle. A personalization command system receives the vehicle operator identification code from the receiver and correlates the code with stored identification codes. The command system will then initiate various adapting systems that correspond to that operator code. Likewise, the personalization command system will cause various personalization devices, such as seat and mirror positioning devices, to be actuated to a position corresponding to the received operator identification code. If one or more of the various personalization devices are adjusted by the vehicle operator a certain percentage beyond the settings that correspond to the received operator ID code, the system will prevent the adapting systems from adapting to the current vehicle operator.

Additional objects, advantages and features of the present invention will become apparent from the following description and appended claims, taken in conjunction with the accompanying drawings.

BRIEF DESCRIPTION OF THE DRAWINGS

FIG. 2 is a chart showing driver identification invalidity.

DETAILED DESCRIPTION OF THE PREFERRED EMBODIMENTS

Figure 1:
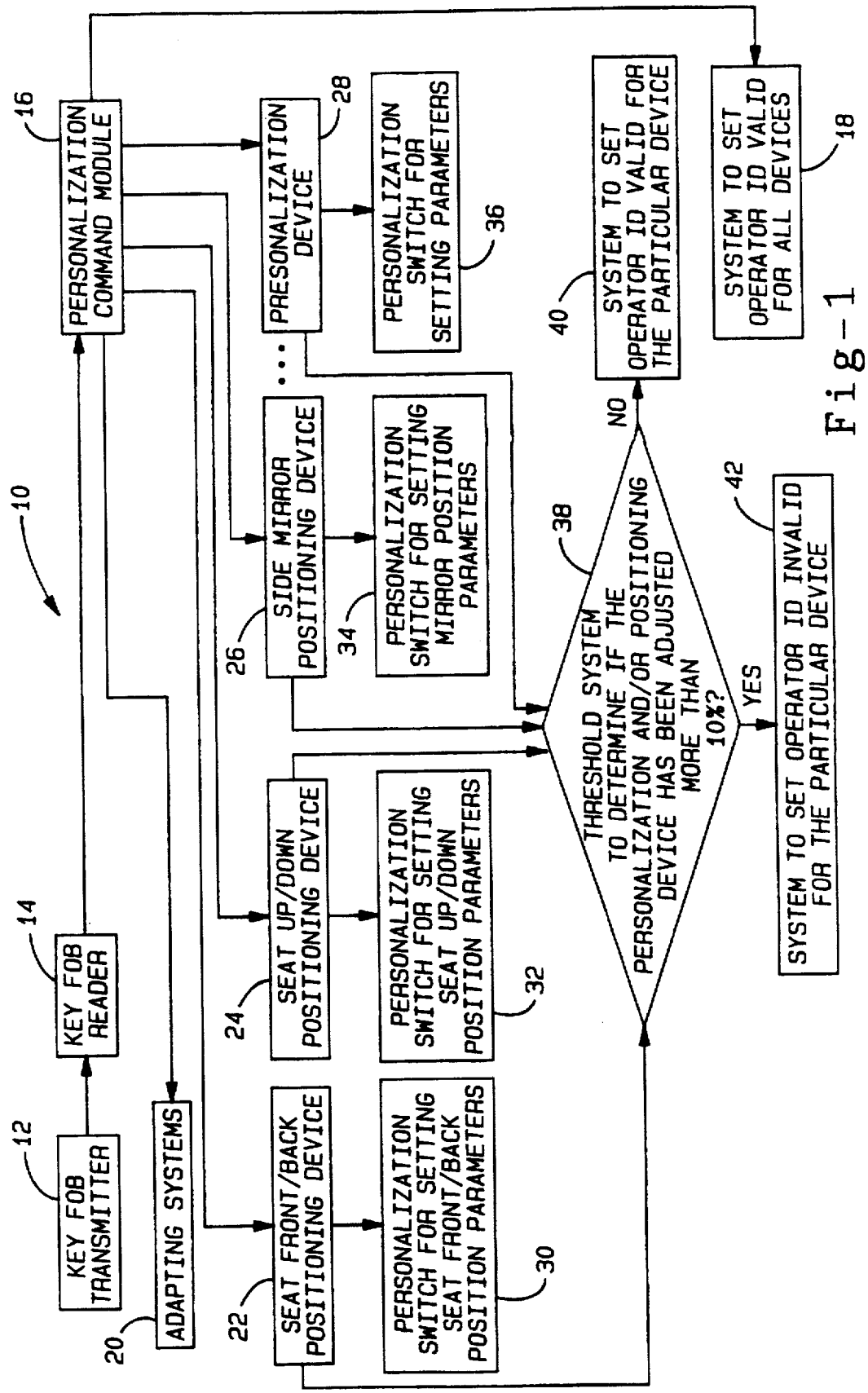
FIG. 1 is a diagram of a vehicle operator identification verification system according to an embodiment of the present invention.

The following description of the preferred embodiments concerning a vehicle operator identification verification system that verifies a particular identification code to a particular vehicle operator is merely exemplary in nature and is in no way intended to limit the invention or its applications or uses.

FIG. 1 shows a diagram depicting a vehicle operator identification verification system 10 according to an embodiment of the present invention. The system 10 includes a key fob transmitter 12 intended to represent known key fob transmitters that remotely transmit a coded signal where the coded signal includes an operator identification code as well as other coded function information for performing certain vehicle functions associated with a vehicle (not shown). For example, the key fob transmitter 12 can be part of a remote keyless entry system that remotely activates the vehicle door locks, trunk, etc. as the vehicle operator approaches or walks away from the vehicle. Such keyless entry systems are well known in the art.

The coded signal transmitted by the key fob transmitter 12 is received by a key fob reader 14 that is part of a receiver system within the vehicle. The key fob reader 14 receives and deciphers the coded signal from the key fob transmitter 12, and provides a signal to a personalization command module 16 that is indicative of the received vehicle operator identification code. The personalization command module 16 will then determine which of one or more preprogrammed vehicle operator identification codes the received identification code corresponds to. The personalization command module 16 will then know which vehicle operator is going to be operating the vehicle.

Once the personal command module 16 determines that the received identification code is a valid identification code that corresponds to a stored identification code, the personalization command module 16 will output a signal to a system 18 that sets each of a series of personalization devices (discussed below) to a valid state. The personal command module 16 will also cause the appropriate parameters of an adaptive system 20 to be activated. In other words, the command module 16 will output a signal to the adaptive system 20 indicative of the received identification code so that the system 20 will know which of one or more different stored adaptations should be initiated and updated. In this regard, the adaptive system 20 is capable of adapting independently to a plurality of different vehicle operators. The adaptive system 20 is intended to represent one or more of the adaptive systems discussed above. Particularly, the adaptive system 20 can represent one or more of the adaptive ECC system, the adaptive instrument display brightness control system, the adaptive system for adjusting the volume level of a vehicle audio system, and the adaptive system that sets the radio frequency of a vehicle at start-up, as well as other adaptive systems that may be developed.

The personalization command module 16 will also output a vehicle operator identification signal to a series of personalization devices that can be adjusted according to which identification signal is received. For example, a seat front/back positioning device 22 represents a known memory seat module and associated electric seat motor that automatically adjusts the front/back position of the drivers side vehicle seat (not shown) to the appropriate location as previously set by the particular vehicle operator corresponding to the identification code. Likewise, a seat up/down positioning device 24 represents a known memory seat module and associated electric seat motor that automatically adjusts the vertical position of the driver side seat depending on the particular signal received from the personalization module 16 as previously set by the particular vehicle operator. A third personalization device is a side mirror positioning device 26 that automatically adjusts the position of the side mirrors (not shown) of the vehicle as previously set by the particular vehicle operator in association with the vehicle operator's identification code. Other personalization devices represented as a personalization device 28 can position other vehicle devices that are personalized in the same manner. For example, other appropriate positioning devices may be incorporated in the vehicle including, but not limited to, devices that automatically adjust the steering wheel tilt position and a head-up display position.

Each of the different personalization devices can be set and reset by a vehicle operator. For example, for a particular vehicle operator identification code, the vehicle operator can readjust the seat front/back positioning device 22 to position the seat to a particular location, then activate a personalization switch 30 that sets the personalization parameters for the activated vehicle operator identification code. In other words, the vehicle operator can adjust the seat front/back positioning device 22 to a different position, and then activate the switch 30 so that the next time the vehicle operator ID code is received, the positioning device 22 will automatically be positioned to the new location. Likewise, a personalization switch 32 is provided for the seat up/down position device 24, a personalization switch 34 is provided for personalizing the side mirror position, and a personalization switch 36 sets the parameters of the personalization device 28.

A position signal from each of the positioning devices 22-26 and the personalization device 28 is applied to a threshold system 38. The threshold system 38 determines if the positioning of the personalization devices 22-28 has been adjusted more than a certain predetermined percentage, here 10%, from the previously personalized setting for that particular device without the switches 30-36 being activated. In other words, once the vehicle operator has adjusted the particular positioning device 22-28 to his preferences, and has activated the personalization switch 30-36 for the particular positioning device 22-28, the system 10 will monitor whether the current vehicle operator has adjusted this position by more than a predetermined percentage. What this does is notify the system 10 that the current vehicle operator may not be the vehicle operator that normally associates with the particular vehicle operator identification code that was received by the personalization command module 16. This is the example given above where a parent has loaned his particular key fob transmitter to a child. The system 10 operates on the assumption that it is better not to adapt the adaptive system 20 if it is unclear whether the right vehicle operator is operating the vehicle.

The specific example of 10% for preventing the system 10 from adapting the various adaptive systems 20 is meant as a non-limiting example. It is well within the scope of the present invention that other percentages could also be used for other specific applications. For example, the threshold system 38 can be set to prevent adaptations of adaptive systems 20 if the positioning of the personalization devices 22-28 has been adjusted by more than 5% at a low end of a worthwhile range, and 30% on a high end of a worthwhile range. Any particular percentage within this range, or outside of this range may be desired for a particular application. Further, an independent switch (not shown) may be incorporated that allows the vehicle operator to set the percentage as desired.

If the system 38 determines that a particular personalization device 22-28 has not been adjusted more than the predetermined percentage, the system 38 will output a valid signal for each device to a system 40 that sets the system 10 valid for each device 22-28. If the operator ID is valid for each device 22-28, the system 10 continues to assume that the vehicle operator associated with the identification code is operating the vehicle, and thus, allows the personal command module 16 to continue to output the appropriate signal to the adapting system 20 to allow these systems to be adapted. If the system 38 determines that a particular personalization device 22-28 has been adjusted more than the predetermined percentage, the system 38 will output an invalid signal to a system 42 that sets the operator ID invalid for that particular device 22-28. For the embodiment here, the system 10 will prevent all of the adapting systems 20 from adapting to the current vehicle operator if the system 42 determines that any of the device positions are invalid.

FIG. 2 shows a chart of when the system 10 indicates that the personalization command module 16 should not verify the vehicle operator identification code. The top chart of FIG. 2 shows that the seat front/back position and the mirror position have been adjusted more than the predetermined percentage, and thus the system 10 sets the vehicle operator ID invalid. Even though the seat up/down position and the personalization device 26 may indicate that the vehicle operator identification code is valid, the overall vehicle operator ID is invalid. Likewise, the bottom chart of FIG. 2 shows that only the mirror position has been adjusted more than the predetermined percentage of the set value, and is thus invalid. The system 10 will prevent the adapting systems 20 from adapting even if one of the personalization devices has been indicated as being invalid.

In a preferred embodiment, each of the adapting systems and personalization devices discussed above would be microprocessor controlled. Since setting the position of the different personalization devices 22-28 are based on a received vehicle operator identification code, the information regarding these positions would be available over a class two data bus associated with the microprocessor system. Therefore, it is straightforward to determine these positions prior to the system 10 allowing adaptation by the adaptation system 20.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

The embodiments of the invention in which an exclusive property or privilege is claimed are defined as follows:

1. A vehicle operator identification verification system comprising:

a personalization command device being responsive to a vehicle operator identification (ID) code, said personalization command device providing a signal indicative of the operator ID code;

at least one personalization device, said at least one personalization device being responsive to the vehicle operator ID code signal from the personalization command device, said at least one personalization device providing an operational setting that is personalized to the vehicle operator ID code;

at least one adaptive system, said at least one adaptive system controlling at least one vehicle system, said adaptive system adapting the at least one vehicle system to a vehicle operator's preference of the at least one vehicle system based on vehicle operator adjustments to the at least one vehicle system; and an analyzing device responsive to the operational setting of the at least one personalization device, said analyzing device preventing the at least one adaptive system from adapting to adjustments made by the vehicle operator to the at least one vehicle system if the operator adjusts the operational setting of the at least one personalization device to be different than a predetermined set operational setting of the at least one personalization device.

2. The system according to claim 1 wherein the at least one personalization device is a plurality of personalization devices and wherein the analyzing device prevents the at least one adaptive system from adapting if the operational setting of any one of the plurality of personalization devices is different than the set operational setting for the personalization device.

3. The system according to claim 1 wherein the at least one personalization device is a plurality of personalization devices including a seat front/back positioning device, a seat up/down positioning device and a side mirror positioning device.

4. The system according to claim 1 wherein the at least one personalization device includes a personalization switch, said personalization switch being activated to establish the set operational setting of the at least one personalization device, said set operational setting being a position of the personalization device that corresponds to the vehicle operator ID code.

5. The system according to claim 1 further comprising a key fob transmitter, said transmitter transmitting the vehicle operator ID code that is received by the personalization command device.

6. The system according to claim 1 wherein the at least one adaptive system is a plurality of adaptive systems selected from the group consisting of an adaptive electronic climate control system, an adaptive instrument display control system, an adaptive system for adjusting the volume level of a vehicle audio system, and an adaptive system for setting a radio frequency of a vehicle radio.

7. The system according to claim 1 wherein the analyzing device prevents the at least one adaptive system from adapting if the operational setting of the at least one personalization device is greater than a predetermined percent of the set operational setting.

8. The system according to claim 1 wherein the operational setting is a position of the at least one personalization device.

9. A vehicle operator identification system comprising:

a vehicle operator identification device being responsive to a vehicle operator identification (ID) code, said identification device providing a signal indicative of the operator ID code; and at least one adaptive system that adapts at least one vehicle system to a preference of a vehicle operator, said adaptive system adapting the at least one vehicle system to a vehicle operator's preference of the at least one vehicle system based on vehicle operator adjustments to the at least one vehicle system, said vehicle operator being identified by the vehicle operator identification code, said at least one adaptive system adapting independently to a plurality of vehicle operator identification codes identifying a plurality of vehicle operator, said at least one adaptive system adapting to the vehicle operator identified by the vehicle operator ID code.

10. The system according to claim 9 wherein the at least one adaptive system is a plurality of adaptive systems selected from the group consisting of an adaptive electronic climate control system, an adaptive instrument display control system, an adaptive system for adjusting the volume level of a vehicle audio system, and an adaptive system for setting a radio frequency of a vehicle radio.

11. The system according to claim 9 further comprising at least one personalization device and an analyzing device, said at least one personalization device being responsive to the vehicle operator ID code from the vehicle operator identification device, said at least one personalization device providing an operational setting that is personalized to the vehicle operator ID code, said analyzing device being responsive to the operational setting of the at least one personalization device, said analyzing device preventing the at least one adaptive system from adapting to adjustments made by the vehicle operator to the vehicle system if the operator adjusts the operational setting of the at least one personalization device to be different that a predetermined set operational setting of the at least one personalization device.

12. The system according to claim 11 wherein the at least one personalization device is a plurality of personalization devices and wherein the analyzing device prevents the at least one adaptive system from adapting if the operational setting of any one of the plurality of personalization devices is different than the set operational setting for the personalization device.

13. The system according to claim 11 wherein the at least one personalization device is a plurality of personalization devices including a seat front/back positioning device, a seat up/down positioning device and a side mirror positioning device.

14. The system according to claim 11 wherein the analyzing device prevents the at least one adaptive system from adapting if the operational setting of the at least one personalization device is greater than a predetermined percentage of the set operational setting.

15. A method of verifying an identification code, said method comprising the steps of:

comparing a received identification code to one or more stored identification codes so as to determine if the received identification code corresponds to an identification code that is stored;

applying the received identification code to at least one adjustable device if the received identification code corresponds to one of the stored identification codes, wherein the at least one adjustable device provides an operational setting that is adjusted to the identification code;

determining if the operational setting of the at least one adjustable device corresponds to a set operational setting of the at least one adjustable device for the received identification code; and preventing an at least one adaptive system from adapting a vehicle system if the operational setting of the at least one adjustable device is different than the set operational setting of the at least one adjustable device by a predetermined percentage, said adaptive system adapting the vehicle system to a vehicle operator's preference of the vehicle system based on vehicle operator adjustments to the vehicle system.

16. The method according to claim 15 wherein the step of comparing verifies a vehicle operator identification code and wherein the at least one adjustable device is a plurality of personalization devices of a vehicle including a seat front/back position device, a seat up/down position device and a side mirror positioning device.

* * * * *